US009582342B2

(12) United States Patent
Gupta et al.

(10) Patent No.: US 9,582,342 B2
(45) Date of Patent: Feb. 28, 2017

(54) API CONSTRAINT LANGUAGE FOR A COMMUNICATION DEVICE

(71) Applicant: NATIONAL INSTRUMENTS CORPORATION, Austin, TX (US)

(72) Inventors: Rohit Gupta, Dresden (DE); Nikhil U. Kundargi, Austin, TX (US); Amal Ekbal, Los Angeles, CA (US); Achim Nahler, Dresden (DE)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 14/694,566

(22) Filed: Apr. 23, 2015

(65) Prior Publication Data

US 2016/0314029 A1 Oct. 27, 2016

(51) Int. Cl.
*G06F 9/54* (2006.01)
(52) U.S. Cl.
CPC .................... *G06F 9/545* (2013.01)
(58) Field of Classification Search
CPC ........................................................ G06F 9/545
See application file for complete search history.

(56) References Cited

U.S. PATENT DOCUMENTS

| 2006/0241929 A1 | 10/2006 | Ferris |
| 2011/0019693 A1* | 1/2011 | Fu ........................... H04L 69/32 370/469 |
| 2012/0106342 A1 | 5/2012 | Kumar |

* cited by examiner

*Primary Examiner* — Syed Roni
(74) *Attorney, Agent, or Firm* — Meyertons Hood Kivlin Kowert & Goetzel, P.C.; Jeffrey C. Hood

(57) ABSTRACT

A communication device and associated method which is configured to utilize an API constraint language for communication of resource constraints between different layers of a communication stack. A first layer of the communication stack executing in a first communication device may receive application programming interface (API) messages from a second layer of the communication stack also executing in the first communication device. In addition, the first layer may receive resource constraints with the one or more API messages. These one or more resource constraints may be generated by the second layer, or other software executing in the communication device. The first layer may then execute communication functions based on the API messages and subject to the resource constraints. The resource constraints may affect usage of hardware and/or software resources of the first communication device during execution of the communication functions.

24 Claims, 8 Drawing Sheets

API CONSTRAINT LANGUAGE FOR A COMMUNICATION DEVICE

FIELD

The present application relates to wireless communication, and more particularly to a constraint language provided with API messages passed between layers of a communication stack for improved communications processing.

DESCRIPTION OF THE RELATED ART

Wireless communication systems are rapidly growing in usage, and communication devices such as mobile phones are now ubiquitous. Communication devices generally operate according to a certain communications protocol, wherein the protocol defines the nature of communications between devices and a network. A protocol stack is a hierarchy of software layers executed by a device to implement a communications protocol. A typical communications protocol ranges from the application layer at the top (the source of the data being sent) to the physical layer at the bottom (which involves transmitting bits over a medium). At least one software protocol stack executes in each communication device to enable each device to communicate according to the respective communication protocol. The layered approach allows for improved organization of the software, and allows the different protocols to be swapped in and out to accommodate different network architectures.

An Application Programming Interface (API) is a form of interface abstraction used to integrate the layers of a communication protocol stack. An API defines the nature and format of messages conveyed between stack layers. In current implementations, it is relatively cumbersome to implement an API across a range of hardware platforms, (e.g., GPP, GPU, FPGA), or across a mix of hardware resources, (e.g., CPU time, bus bandwidth, etc.). Thus, improvements in the field are desired.

SUMMARY

Embodiments are presented herein of, inter alia, a communication device and associated method which is configured to utilize an API constraint language for communication of resource constraints between different layers of a communication stack. The communication device may be a User Equipment (UE), e.g., a mobile device or smart phone, a cellular base station, a WiFi access point (AP), or other type of communication device.

The method may be implemented by a first layer of the communication stack executing in a first communication device. The first layer may receive one or more application programming interface (API) messages from a second layer of the communication stack also executing in the first communication device. In addition, the first layer may receive one or more resource constraints with the one or more API messages. These one or more resource constraints may be generated by the second layer, or other software executing in the communication device. The first layer may then execute one or more communication functions based on the one or more API messages and subject to the one or more resource constraints. The one or more resource constraints may affect usage of one or more hardware and/or software resources of the first communication device during execution of the one or more communication functions.

In some embodiments, the one or more resource constraints affect one or more of timing, latency, throughput, priority or performance of the one or more communication functions performed by the device. For example, the one or more resource constraints may specify dynamic allocation of the one or more hardware and/or software resources on the first communication device during execution of the one or more communication functions. Example hardware resources may include one or more of CPU time, bus bandwidth, or memory allocation, among others. The one or more resource constraints may be useable by any one of a plurality of possible hardware target types executing the first layer, including general purpose processor, graphical processing unit, digital signal processor, or programmable hardware element.

In some embodiments, the one or more resource constraints may be received in the form of an API Constraint Vector, wherein the API Constraint Vector (ACV) is a data structure comprising the one or more resource constraints. The ACV may comprise a plurality of fields which are predefined to store information regarding respective ones of the resource constraints.

In some embodiments, software executing in the communication device may ensure that the one or more communication functions are executed subject to the one or more resource constraints. For example, software may measure if the one or more one or more resource constraints are satisfied and provide feedback to the second layer based on the measurement(s).

The one or more resource constraints may be dynamically determined during operation of the first communication device based on current communication conditions. The current communication conditions may comprise a current quality of a communication channel being used by the first communication device, the type of application executing on the communication device, priority of the packets currently being processed, etc.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
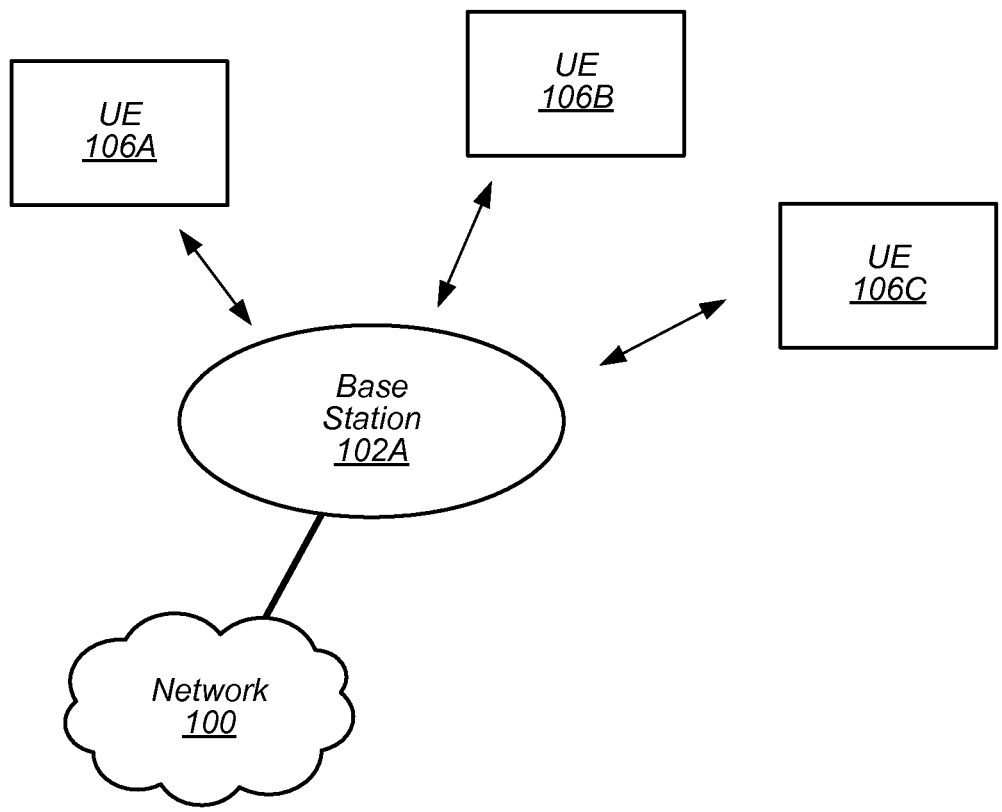
FIG. 1 illustrates an exemplary wireless communication system including a base station communicating with one or more UEs.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks (gate arrays) connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements. Processing elements include, for example, circuits such as an ASIC (Application Specific Integrated Circuit), portions or circuits of individual processor cores, entire processor cores, individual processors, programmable hardware elements such as a field programmable gate array (FPGA), and/or larger portions of systems that include multiple processors.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular telephone system or radio system.

Access Point—The term "Access Point" has the full breadth of its ordinary meaning, and at least includes a device for providing wireless access to other devices (UE devices) to any of the WiFi (Wireless Fidelity) base standards, e.g., any of the IEEE 802.11 based standards. IEEE 802.11 based standards may be referred to herein as WiFi or WLAN (Wireless LAN).

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless communication system. It is noted that FIG. 1 represents one possibility among many, and that features of the present disclosure may be implemented in any of various systems, as desired.

As shown, the exemplary wireless communication system includes a base station 102A, which communicates over a transmission medium with one or more wireless devices 106A, 106B, 106C, etc. Wireless devices may be user devices, which may be referred to herein as "user equipment" (UE) or UE devices.

The base station 102A may be a base transceiver station (BTS) or cell site, and may include hardware that enables wireless communication with the UE devices 106A, 106B and 106C. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the UE devices 106 and/or between the UE devices 106 and the network 100. In other implementations, base station 102A can be configured to also provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102A may be referred to as a "cell." The base station 102A and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

Figure 2:
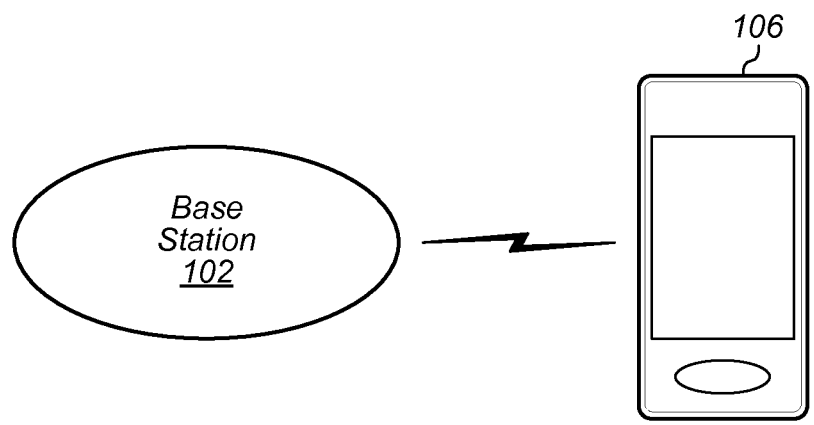
FIG. 2 illustrates an example base station communicating with a UE.
Figure 3:
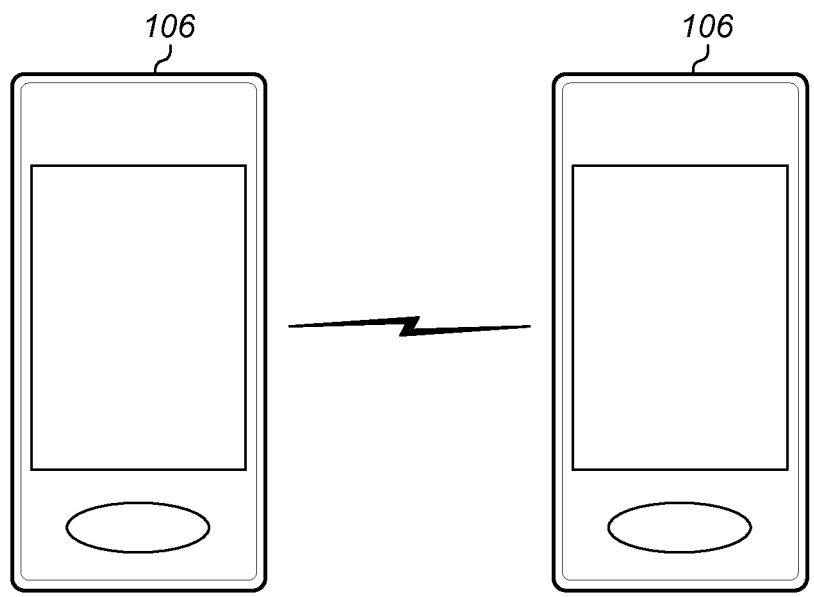
FIG. 3 illustrates two UEs communicating in a peer to peer manner.
Figure 4:
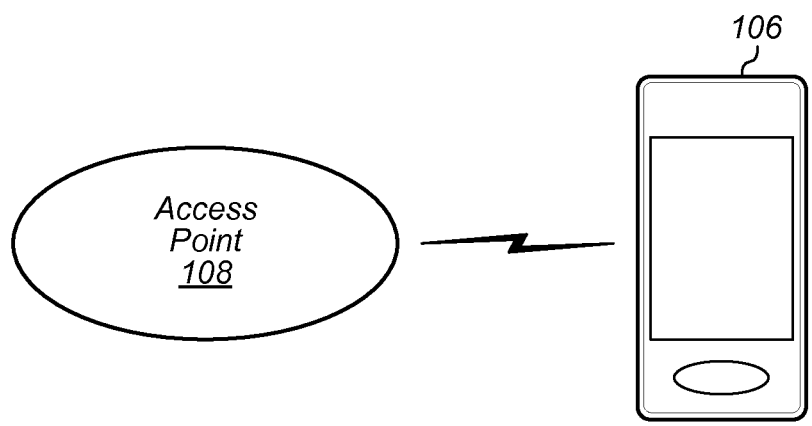
FIG. 4 illustrates an example WiFi access point communicating with a UE.

FIG. 2 illustrates an example UE device 106 (e.g., one of the devices 106A through 106N) in communication with base station 102. The UE device 106 may have cellular and/or WLAN communication capability, and as described above, may be a device such as a mobile phone, a hand-held device, a media player, a computer, a laptop a tablet, a wearable device, or any type of wireless device. FIG. 3 shows a first UE device 106 communicating in a peer-to-peer manner with a second UE device. FIG. 4 shows a UE device 106 communicating with a WiFi access point 108.

The UE device 106 may include at least one processing element. The processing element may be a general purpose processor that is configured to execute program instructions stored in memory. Alternatively, or in addition, the processing element may be a programmable hardware element (PHE), such as an FPGA. As another alternative, the processing element may be an ASIC, or other circuitry, that is configured to perform any of the method embodiments described herein, or any portion of any of the method embodiments described herein. The UE device 106 may perform any of the method embodiments described herein by executing stored instructions, and/or via operation of a configured PHE and/or ASIC.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 5:
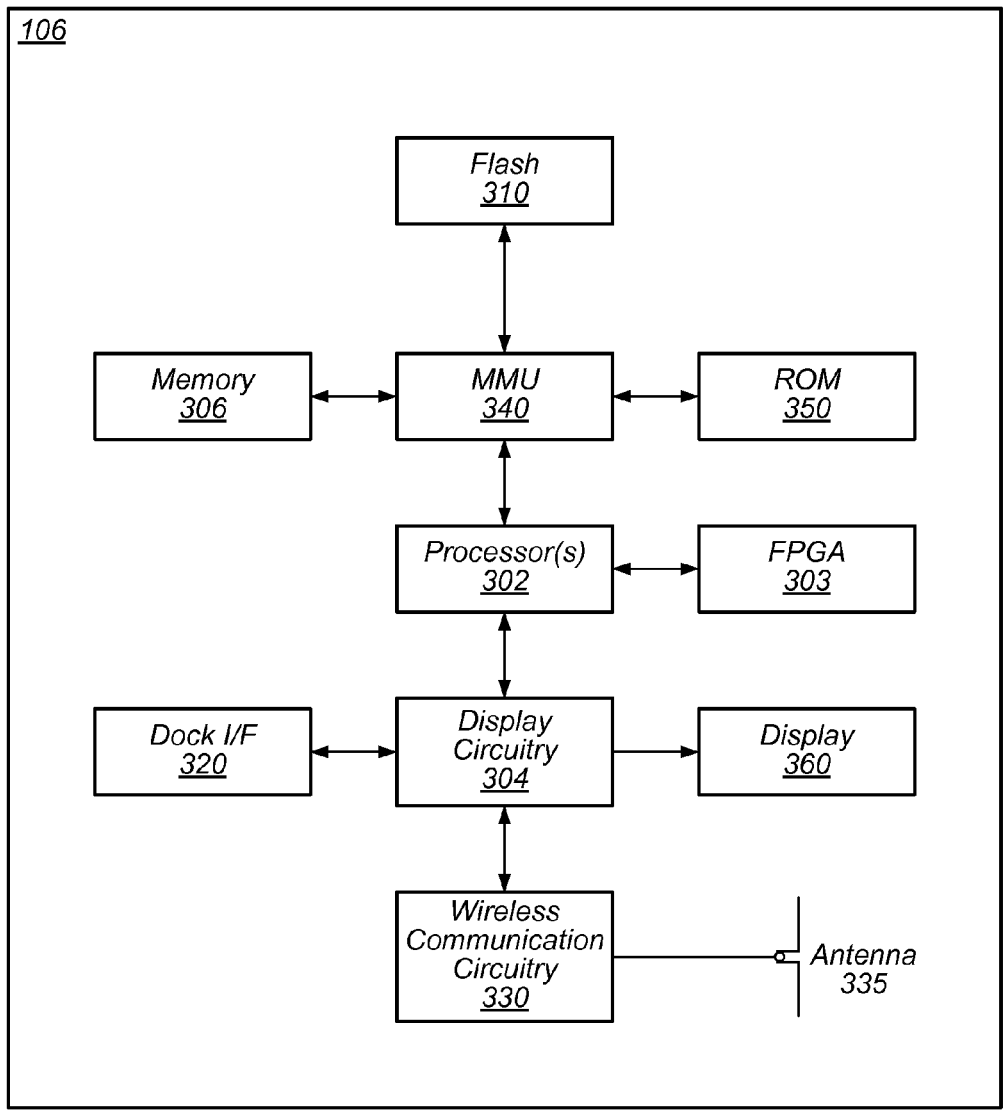
FIG. 5 is a block diagram for one possible implementation of a representative communication device, such as a User Equipment (UE), base station, access point, etc.

FIG. 5—Example Block Diagram of a Communication Device

FIG. 5 illustrates one possible block diagram of a communication device, such as a UE 106, BS 104, AP 108, etc. In the example shown, the communication device may comprise one or more processing elements, such as at least one processor(s) 302 and at least one programmable hardware element (PHE) 303. The processor(s) 302 may also be coupled to memory management unit (MMU) 340, which may be coupled to memory (e.g., memory 306, read only memory (ROM) 350, and/or Flash memory 310). The memory (306, 350, or 310) may store program instructions that are executable by the processor. For example one of the memories may store a portion or all of a software stack comprising a plurality of software layers. In addition, the PHE 303 may be configured to perform a portion or all of the layers of the software stack.

The UE 106 may also include other circuits or devices, such as the display circuitry 304, wireless communication circuitry 330, connector I/F 320, and/or di splay 360. Display circuitry 304 may perform graphics processing and provide display signals to the display 360.

In the embodiment shown, the UE may comprise a connector interface 320 (e.g., for coupling to a computer system), the display 340, and wireless communication circuitry 330 (e.g., for communication using LTE, CDMA2000, Bluetooth, WiFi, NFC, GPS, etc.).

The UE device 106 may include at least one antenna, and in some embodiments multiple antennas, for performing wireless communication with base stations, access points, and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing layers of a communication stack, and for providing API messages and associated resource constraints between layers of the stock, according to embodiments of this disclosure. The processor 302 and/or the PHE 303 of the UE device 106 may be configured to implement part or all of the methods described herein, e.g., by executing program instructions stored on a memory medium (e.g., a non-transitory computer-readable memory medium), or as a configured gate array (PHE). In various embodiments, the processing element(s) in the UE 106 may be one or more of a processor 302, a programmable hardware element 303, such as an FPGA (Field Programmable Gate Array), and/or as an ASIC (Application Specific Integrated Circuit), or some combination thereof.

Figure 6:
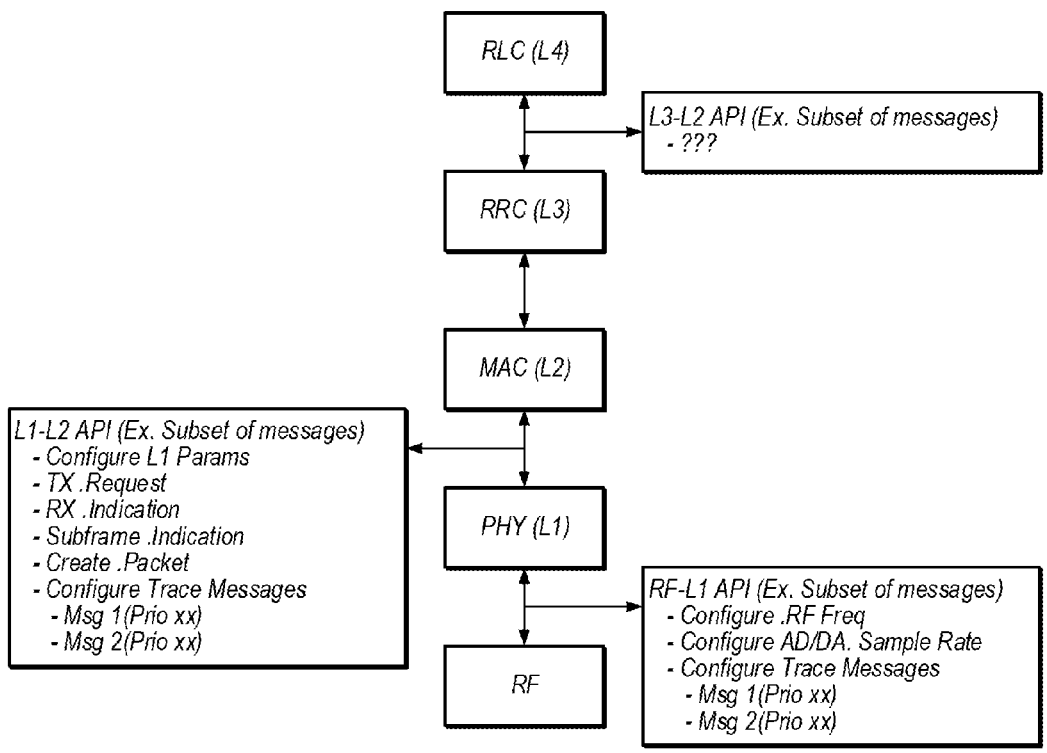
FIG. 6 is a block diagram illustrating an example OSI Stack API according to the prior art.

FIG. 6—Typical OSI Stack API

FIG. 6 illustrates an OSI stack API. As shown, the stack includes various layers which communicate with RF (radio frequency) circuitry. The stack layers include a PHY (physical) layer, a MAC (media access control) layer, a RRC (radio resource control) layer, and an RLC (radio link control) layer. The PHY, MAC, RRC and RLC layers may be labeled as L1-L4, respectively, as shown.

The MAC (L2) and PHY (L1) layers exchange messages, which may include transmission requests, reception indications, sub-frame indications, and which may also serve to configure L1 parameters, create packets, and configure trace messages. The RF and PHY (L1) layers may exchange messages, e.g., in order to configure reception frequencies, configure AD/DA sample rate, and configure trace messages. Similarly, the MAC (L2) and RRC (L3) layers may exchange various other messages.

Each message exchanged between the protocol layers may interact with a state machine at both its source and destination layers. Each message may have a definition, e.g., in terms of frame format and header structure, as well as one or more resource constraints, e.g., real-time requirements such as throughput, latency, jitter tolerance, and priority. These constraints are only examples and other constraints may be used based on the application.

The API framework may not describe the API message constraints. Rather, API message constraints may be designated by or adapted to a specific hardware platform. Thus, implementation of the API may be limited to specific hardware systems. In other words, the API may be unable to be implemented in a hardware-agnostic manner because API message constraints may be configured for use with certain hardware systems. In this case, changing the functional behavior and parameters of API messages, e.g., for the purpose of testing or implementing different algorithms, may necessitate reconfiguring the API constraints and/or the hardware system. This dependent relationship with specific hardware systems may also inhibit the implementation of the API across a range of hardware platforms, (e.g., GPP, GPU, FPGA), or across a mix of hardware resources, (e.g., PXIe bus bandwidth). Thus, it would be desirable to be able to more efficiently implement the API across multiple hardware platforms.

The framework may be extended to implement a framework wherein the API implementation may be hidden from users across different hardware platforms (e.g., GPP, GPU, FPGA, etc.). The API language may be integrated into the compiler (e.g., LabVIEW), which may allow for hardware resource allocation (e.g., processor time, FPGA resources, bus throughput, etc.) for API messages at compile time and/or run-time. This framework may inform the end user when API constraints have been violated by the system. Thus, this framework would allow for a hardware-agnostic API implementation hidden from the user.

Figure 7:
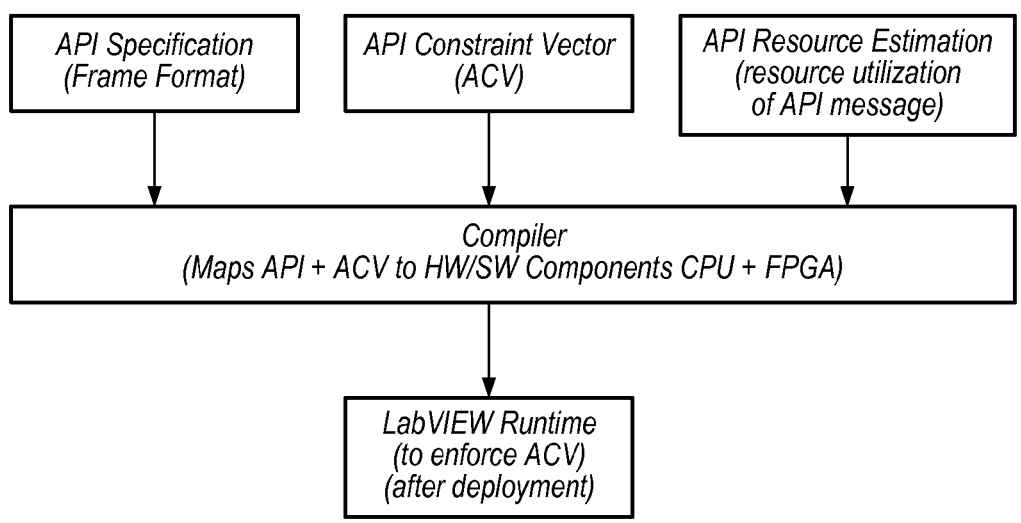
FIG. 7 illustrates one example of compiler operation utilizing an API constraint vector (ACV)

FIG. 7—Example Compiler Operation

FIG. 7 illustrates operation of a compiler according to some embodiments. As shown, the system may include a compiler which receives an API specification, an API Constraint Vector (ACV), and information regarding API resource estimation.

The API specification may comprise information regarding the format of API function calls which may be passed to the software/hardware description that is created by the compiler. In other words, the API specification may contain information useable by the compiler to enable the compiler to understand received function calls based on the API.

The API Constraint Vector may comprise information on the format of a data structure which contains constraint information. In other words, the ACV information may contain information useable by the compiler to create code that is capable of understanding a received API Constraint Vector. As noted above, the constraint information may be provided alongside the API function call during execution of the software (or hardware configuration program) created by the compiler.

The API Resource Estimation may comprise information regarding the amount of hardware/software resources needed during execution of a received API function call. The API Resource Estimation information may be calculated offline based on the hardware/software capabilities of the platform. For example, the API Resource Estimation information may be calculated by a user based on his knowledge of the platform, or by various software tools, or some combination thereof.

The compiler may operate to receive each of the API Specification, the API Constraint Vector, and the API Resource Estimation. The compiler may also receive source code (not shown) and generate one or more of machine code or a hardware description. The compiler may map the API and ACV to hardware and software components, such as an FPGA, designating sufficient resources (e.g., CPU, DMA, FIFO and FPGA) for each API message and its associated ACV.

Figure 8:
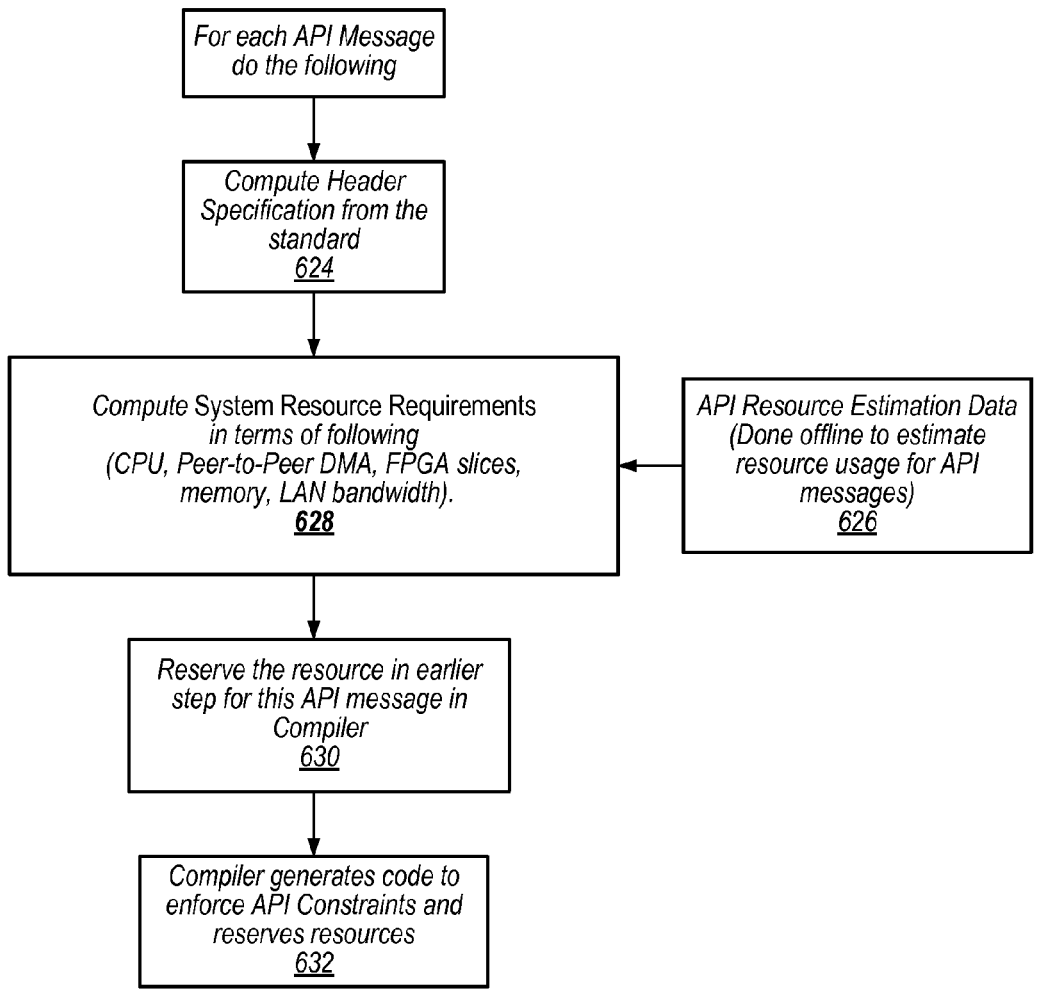
FIG. 8 is a flowchart diagram illustrating one example of operation of the compiler according to some embodiments.

FIG. 8—Detailed Compiler Operation

FIG. 8 is a flow diagram illustrating operation of the compiler according to some embodiments. As shown, for each API message, i.e., each type of API message, the operations in 624-632 may be performed.

At 624 the compiler may first compute a header specification from the relevant telecommunication standard. This may involve determining the appropriate variables needed for the relevant telecommunication standard, e.g., LTE, 802.11, etc.

At 628 the compiler may compute system resource requirements in terms of various resources, e.g., CPU, Peer-to-Peer DMA, FPGA slices, memory, and LAN bandwidth. It is noted that the kind of resources present in the system can be extended to other entities such as (memory, side peripherals, etc.) As shown at 626, API resource estimation data may be provided to the compiler to aid in the computation of step 628. This data may be determined offline and may aid in the calculation of resource usage of API messages. For example, the impact on throughput, latency, and jitter across PXIe can be calculated offline based on the load of the system. The resulting data may be used as a guide for implementing an ACV at compile time or run-time. This offline calibration may also be refined at run-time using more dynamic algorithms.

As one example of how the API constraint vector may be implemented, for throughput/latency/jitter across the shared bus or communication interconnect in the UE, the impact on these parameters can be calibrated offline based on the load of the system and this can be used as a guide for implementing the ACV, whether at compile time or runtime. Such, an offline calibration can also be refined at run-time using more dynamic algorithms.

At 630 the compiler may operate to reserve the resources required by the API message as determined at 628.

At 632 the compiler may generate code which is capable of enforcing API constraints and reserving resources during execution. The resources that may be reserved include one or more of the following types: CPU, DMA, FIFO and FPGA).

Figure 9:
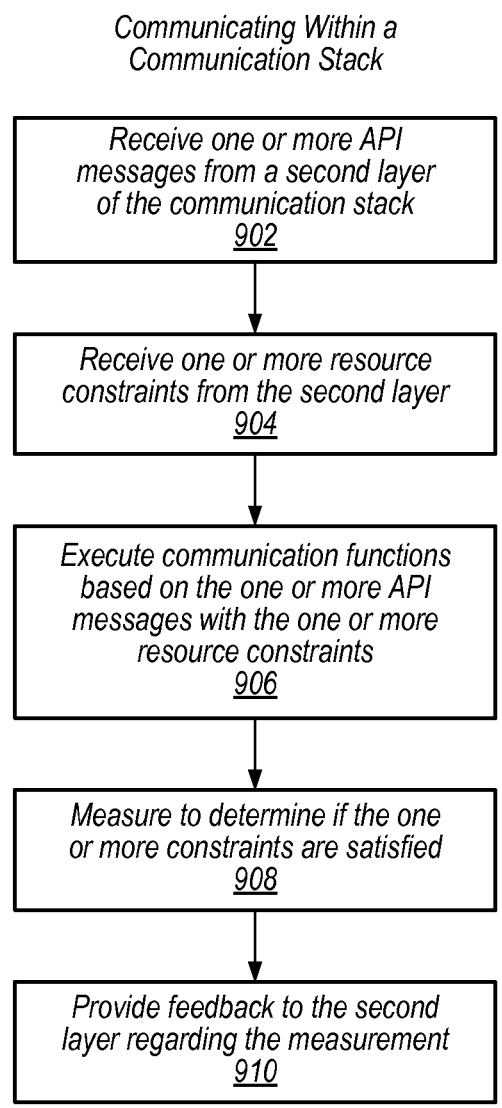
FIG. 9 is a flowchart diagram illustrating one example of a method by which protocol stack layers may communicate resource constraints along with API messages.

FIG. 9—Communicating Within a Communication Stack

FIG. 9 illustrates communications between layers of a communications protocol stack according to some embodiments. These communications may occur at runtime, i.e., as part of active wireless communications on the UE device on which the communications stack is executing.

At 902, a first layer of the communication stack receives one or more API messages from a second layer. The first layer may be one of any of the PHY, MAC, RRC, or RLC layers, or any other software layer in the communications protocol stack that interacts with other layers. The second layer may be any other layer of the communications stack that is capable of communicating with the first layer, e.g., is adjacent to the first layer or interacts directly with the first layer.

At 904, the first layer may receive one or more resource constraints from the second layer, which correspond to the API message. The resource constraints may be received in the form of an API Constraint Vector, wherein the API Constraint Vector (ACV) is a data structure containing the constraints. The ACV data structure may comprise fields that are configured to store certain resource constraint types.

The resource constraints may comprise real-time requirements such as throughput, latency, jitter tolerance, and priority. The constraints may also specify dynamic allocation of the one or more hardware and/or software resources on the first communication device (e.g., CPU time, bus bandwidth, DMA resources, memory resources, etc.). The constraints may be useable by any one of a plurality of possible hardware target types executing the first layer, including a general purpose processor, graphical processing unit, digital signal processor, or programmable hardware element.

At 906, the first layer may execute communication functions based on the one or more API messages received at 902. Example communication functions include state machine transitions. These communications functions may be performed based on or according to (or may be affected by) the resource constraints as received at 904. For example, the resource constraints may influence the timing, latency, throughput, priority or performance of the communication functions.

At 908, the first layer may determine if one or more of the constraints are satisfied. At 910 the first layer may provide feedback to the second layer regarding the measurement. For example, the first layer may communicate to the second layer (or as error feedback to the developer) if preferred conditions indicated by the constraints received at 904 were not met in the execution of the communication functions at 906.

Figure 10:
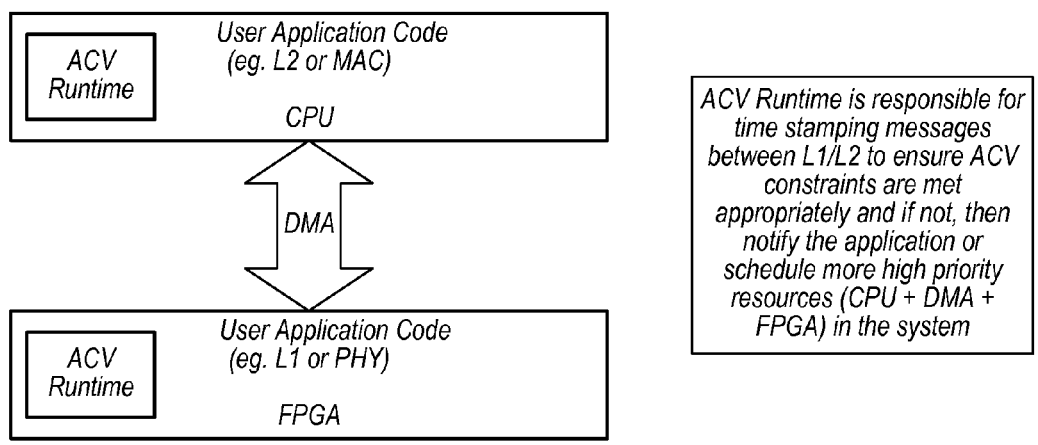
FIG. 10 illustrates one example of a method by which an API constraint vector may be enforced at runtime.

FIG. 10—Runtime Enforcement of ACV

FIG. 10 illustrates an example of the runtime interaction between CPU and FPGA layers during active wireless communications on a UE device in order to enforce API constraints. The CPU, i.e., L2 or the MAC layer, may execute user application code. The FPGA, i.e., L1 or the PHY layer, may interact with the CPU using a DMA protocol. The ACV runtime operation may time-stamp messages between L1 and L2, i.e., note the times at which the messages were received or processed, so that it can be determined whether runtime constraints were met, e.g, whether a message was delivered in the correct timeframe. If the constraints are not met, then the ACV runtime may notify the associated application or schedule more high priority resources (e.g., CPU, DMA, FPGA) in the system to help meet these constraints during subsequent execution.

The following describes an example of usage of the ACV as an example framework as an add-on to existing LTE API messages. The table below shows an example generic L1-L2 implementation that can be easily applied to either the base station (eNodeB) or the UE. This table illustrates how the ACV can be applied to reserve hardware (or software) resources for efficient API implemention.

| Message Class | Message Name | Description | ACV Fields |
| --- | --- | --- | --- |
| L2-L1 | TX.Request Applies to different PHY layer channels: BCH, PCH, DL-SCH, UL-SCH, MCH (depending on eNB/UE) | Message to transmit L1 payload | Frequency = 0.001 s (defines throughput) Latency = 0.01 ms Jitter <= 0.005 ms Priority = 2 (1-Highest) |
| | RX.Indication (carries different PHY channels depending on eNB/UE) | Message received from L1 | Frequency = 0.001 s (defines throughput) Latency = 0.01 ms Jitter <= 0.005 ms Priority = 2 (1-Highest) |

-continued

| Message Class | Message Name | Description | ACV Fields |
|---|---|---|---|
| | Subframe.Indication | Marks the synchronization between L1-L2 Interface | Frequency = 0.001 s (defines throughput)<br>Latency = 0.005 ms<br>Jitter <= 0.001 ms<br>Priority = 1 (1-Highest) |
| | DL.Config_Request | Configure DL Parameters | Frequency = 0.001 s (defines throughput)<br>Latency = 0.005 ms<br>Jitter <= 0.001 ms<br>Priority = 1 (1-Highest) |
| | CQI.Reporting, SRS.Reception | Receive CQI Reports from UE (Applicable to eNB only) | |
| | UL.Config_Request | Configure UL Parameters | Frequency = 0.001 s (defines throughput)<br>Latency = 0.005 ms<br>Jitter <= 0.001 ms<br>Priority = 1 (1-Highest) |
| | Create.Packet | Creates a memory for holding a packet buffer | Frequency = 0.001 s<br>Latency = 0.0005 ms<br>Jitter <= 0.0001 ms<br>(Guides the memory allocation unit for pre-allocation of buffers, etc in order to avoid severe impact on real-time performance) |
| | Configure.RF_Params | Configure RF Parameters | Frequency = 0.001 s (defines throughput)<br>Latency = 0.005 ms<br>Jitter <= 0.001 ms<br>Priority = 1 (1-Highest) |
| | Start.PHY | Start PHY interface | Frequency = 0.001 s (defines throughput)<br>Latency = 0.005 ms<br>Jitter <= 0.001 ms<br>Priority = 1 (1-Highest) |
| | Stop.PHY | Stop PHY interface | Frequency = 0.001 s (defines throughput)<br>Latency = 0.005 ms<br>Jitter <= 0.001 ms<br>Priority = 1 (1-Highest) |

-continued

| Message Class | Message Name | Description | ACV Fields |
|---|---|---|---|
| | Reset.PHY | Reset PHY interface | Frequency = 0.001 s (defines throughput) Latency = 0.005 ms Jitter <= 0.001 ms Priority = 1 (1-Highest) |
| | Trace.Message_L2-L1 | Custom Trace Messages Trace messages are supposed to have higher throughput, but can tolerate much lower latency, hence lowest priority. | Frequency = 0.001 s (defines throughput) Priority = 10 (1-Highest) |
| RF-L1 | Configure.RF_Frequency | Configures RF Frequency | |
| | Configure.RF_Bandwidth | Confogures RF Bandwidth | |
| | Configure.AD/DA_Sample_Rate | Configure AD/DA sampling parameters | |
| | Trace.Message_RF-L1 | Trace message group for RF-L1 Interface. Low priority and high throughput. | |

Similar examples to the example table above can be developed for other communication standards, such as WiFi, LTE unlicensed, cognitive radio, and LTE/WiFi, etc.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for communicating within a communication stack comprising layers, the method comprising:
   receiving, by a first layer of the communication stack executing in a first communication device, one or more application programming interface (API) messages from a second layer of the communication stack executing in the first communication device;
   receiving, by the first layer, one or more resource constraints with the one or more API messages, wherein said receiving the one or more resource constraints comprises receiving an API Constraint Vector, wherein the API Constraint Vector (ACV) is a data structure comprising the one or more resource constraints, wherein the ACV comprises a plurality of fields which are predefined to store information regarding respective ones of the resource constraints; and
   executing, by the first layer, one or more communication functions based on the one or more API messages and subject to the one or more resource constraints, wherein the one or more resource constraints affect usage of one or more hardware and/or software resources of the first communication device during execution of the one or more communication functions.

2. The method of claim 1,
   wherein the one or more resource constraints affect one or more of timing, latency, throughput, priority or performance of the one or more communication functions.

3. The method of claim 1,
   wherein the one or more resource constraints specify dynamic allocation of the one or more hardware and/or software resources on the first communication device during execution of the one or more communication functions.

4. The method of claim 1,
wherein the hardware resources comprise one or more of central processing unit (CPU) time, bus bandwidth, and/or memory allocation.

5. The method of claim 1,
wherein the one or more resource constraints are useable by any one of a plurality of possible hardware target types executing the first layer, including general purpose processor, graphical processing unit, digital signal processor, or programmable hardware element.

6. The method of claim 1,
wherein said executing comprises ensuring that the one or more communication functions are executed subject to the one or more resource constraints.

7. The method of claim 1, further comprising:
measuring if the one or more resource constraints are satisfied; and
providing feedback to the second layer based on said measuring.

8. The method of claim 1,
wherein the one or more resource constraints are dynamically determined during operation of the first communication device based on current communication conditions.

9. The method of claim 8,
wherein the current communication conditions comprise a current quality of a communication channel being used by the first communication device.

10. A non-transitory computer readable memory medium comprising program instructions which implement a first layer of a communication stack, wherein the first layer of the communication stack executes on a first communication device, wherein the program instructions are executable to:
receive one or more application programming interface (API) messages from a second layer of the communication stack executing in the first communication device;
receive one or more resource constraints with the one or more API messages wherein, in receiving the one or more resource constraints, the program instructions are executable to receive an API Constraint Vector, wherein the API Constraint Vector (ACV) is a data structure comprising the one or more resource constraints, wherein the ACV comprises a plurality of fields which are predefined to store information regarding respective ones of the resource constraints; and
execute one or more communication functions based on the one or more API messages and subject to the one or more resource constraints, wherein the one or more resource constraints affect usage of one or more hardware and/or software resources of the first communication device during execution of the one or more communication functions.

11. The non-transitory computer readable memory medium of claim 10,
wherein the one or more resource constraints affect one or more of timing, latency, throughput, priority or performance of the one or more communication functions.

12. The non-transitory computer readable memory medium of claim 10,
wherein the one or more resource constraints specify dynamic allocation of the one or more hardware and/or software resources on the first communication device during execution of the one or more communication functions.

13. The non-transitory computer readable memory medium of claim 10,
wherein the hardware resources comprise one or more of central processing unit (CPU) time, bus bandwidth, or memory allocation.

14. The non-transitory computer readable memory medium of claim 10,
wherein the one or more resource constraints are useable by any one of a plurality of possible hardware target types executing the first layer, including general purpose processor, graphical processing unit, digital signal processor, or programmable hardware element.

15. The non-transitory computer readable memory medium of claim 10,
wherein the program instructions further execute to ensure that the one or more communication functions are executed subject to the one or more resource constraints.

16. The non-transitory computer readable memory medium of claim 10, wherein the program instructions are further executable to:
measure if the one or more resource constraints are satisfied; and
provide feedback to the second layer based on said measuring.

17. The non-transitory computer readable memory medium of claim 10,
wherein the one or more resource constraints are dynamically determined during operation of the first communication device based on current communication conditions.

18. The non-transitory computer readable memory medium of claim 17,
wherein the current communication conditions comprise a current quality of a communication channel being used by the first communication device.

19. A communication device, comprising
at least one antenna for performing wireless communication;
transmit/receive circuitry coupled to the at least one antenna
at least one processing element coupled to the transmit/receive circuitry;
a memory coupled to the at least one processing element which stores a protocol stack that is executable by the at least one processing element to perform communication functions in the communication device, wherein the protocol stack comprises a plurality of layers including at least a first layer and a second layer;
wherein a first layer executing on the at least one processing element is configured to:
receive one or more application programming interface (API) messages from a second layer of the communication stack;
receive one or more hardware resource constraints with the one or more API messages, wherein said receiving the one or more hardware resource constraints comprises receiving an API Constraint Vector, wherein the API Constraint Vector (ACV) is a data structure comprising the one or more hardware resource constraints, wherein the ACV comprises a plurality of fields which are predefined to store information regarding respective ones of the hardware resource constraints; and execute, by the first layer, one or more communication functions based on the one or more API messages and subject to the one or more hardware resource constraints, wherein the one or more hardware resource constraints affect usage of one or more hardware resources of the first communication device.

20. The communication device of claim 19,
wherein the at least one processing element is a programmable hardware element;
wherein the programmable hardware element is configured to implement the first layer;
wherein the programmable hardware element is further configured to implement functionality to perform the one or more communication functions of the first layer subject to the one or more resource constraints.

21. The communication device of claim 20,
wherein the programmable hardware element is further configured to dynamically allocate hardware resources of the communication device based on the one or more constraints, wherein the hardware resources include the programmable hardware element and at least one other hardware resource of the communication device.

22. A method for communicating within a communication stack comprising software layers, the method comprising:
performing, by a first layer of the communication stack,
generating one or more application programming interface (API) messages for provision to a second layer of the communication stack;
specifying one or more resource constraints in response to current communication conditions, wherein the one or more resource constraints are intended for a second layer of the communication stack, wherein the one or more resource constraints are comprised within an API Constraint Vector (ACV), wherein the ACV comprises a plurality of fields which are predefined to store information regarding respective ones of the resource constraints; and
transmitting the one or more API messages and the one or more resource constraints to the second layer of the communication stack,
wherein the one or more resource constraints are useable by the second layer to affect usage of one or more hardware and/or software resources during execution of communication functions based on the one or more API messages.

23. The method of claim 22,
wherein the one or more resource constraints are one or more of timing related, latency related, throughput related, priority related or end to end performance metric related.

24. The method of claim 22,
wherein the one or more constraints are operable to be transmitted to any one of a plurality of possible hardware targets executing the second layer, including general purpose processor, graphical processing unit, or programmable hardware element.

* * * * *